INVENTOR.
Homer E. Benson
Joseph H. Field
BY
Donald G. Leslie
ATTORNEY

April 24, 1962

H. E. BENSON ET AL 3,031,287

PROCESS FOR MANUFACTURING MIXTURES OF
HYDROGEN, CARBON MONOXIDE AND METHANE

Filed June 23, 1958

INVENTOR.
Homer E. Benson
Joseph H. Field
BY
Donald G. Welsh
ATTORNEY 3,031,287
PROCESS FOR MANUFACTURING MIXTURES OF HYDROGEN, CARBON MONOXIDE, AND METHANE
Homer E. Benson and Joseph H. Field, Pittsburgh, Pa., assignors to the United States of America as represented by the Secretary of the Interior
Filed June 23, 1958, Ser. No. 744,026
13 Claims. (Cl. 48—197)
(Granted under Title 35, U.S. Code (1952), sec. 266)

The invention herein described and claimed may be manufactured and used by or for the Government of the United States of America for governmental purposes without the payment of royalties thereon or therefor.

This invention relates to the preparation of synthesis gas for use in the Fischer-Tropsch and related processes. Present methods for making synthesis gas ($H_2$+CO) or gases containing relatively large amounts of methane from coal involve the use of coal, oxygen, and steam. From a technical standpoint this is a satisfactory method, but the requirement for oxygen is 300–350 ft.$^3$/1000 ft.$^3$ of synthesis gas and amounts to about half the raw material cost. The cost of the required oxygen plant for a Fischer-Tropsch operation of 10,000 barrels per day has been estimated to be about $25 million out of a total plant cost of $150 million. This size Fischer-Tropsch plant would require 7,700 tons per day of coal, out of which 1000 tons per day would go to the power requirements for the oxygen plant. Thus, it can be seen that the use of oxygen makes Fischer-Tropsch synthesis gas relatively costly. Since 60–70% of the cost of synthetic gasoline is attributable to the synthesis gas, any economy in synthesis gas preparation would be reflected in the production cost of the gasoline.

Gases that contain relatively large amounts of methane, as well as hydrogen and carbon monoxide, are valuable for industrial and domestic heating gases because of the greater calorific value of the methane. Again, the cost of oxygen is a major cost factor in preparing a synthetic heating gas from coal.

The objects of this invention are:

(1) To provide a process for the manufacture of synthesis gas in which the use of concentrated oxygen, oxygen enriched air, or commercial oxygen is not required.

(2) To produce synthesis gas from producer gas by a process which does not require the removal of nitrogen.

(3) To provide a continuous process for producing synthesis gas from iron and iron oxides, carbon monoxide and hydrogen containing gases such as Fischer-Tropsch tail gas or producer gas, or gas made by oil gasification; and steam alone or admixed with carbon dioxide.

(4) To produce synthesis gas by reacting metal carbides, specifically cementite, $Fe_3C$, with steam and $CO_2$.

(5) To produce synthesis gas by reacting metal oxides, specifically iron oxides with producer gas to form metal carbides, e.g., iron carbides, and then reacting such carbides with steam and $CO_2$.

(6) To generate synthesis gas under a pressure substantially that employed in the Fischer-Tropsch reaction.

(7) To generate synthesis gas under operating conditions that are selected to favor a small methane content or a large methane content in the synthesis gas.

(8) To produce a fuel gas having an enhanced B.t.u. content.

(9) To produce a gas consisting largely of methane by the reaction of $Fe_3C$ with steam.

Other objects of the invention will be obvious from the detailed description of the invention appearing in the drawing and specification.

In accordance with the present invention, producer gas is continuously made from coal, air and steam, and reacted with iron, iron oxide, or mixtures thereof, at atmospheric pressure or preferably at elevated pressures in a reducing stage. Not only are the oxides reduced to the free metal, but under certain conditions iron carbide (cementite) and some free carbon are produced as well.

The principal reactions taking place during this reducing and carburizing stage are:

| Reaction | $\Delta H$ (700° C.) calories |
|---|---|
| (1) $Fe_3O_4 + 4CO \rightleftarrows 3Fe + 4CO_2$ | −9,700 |
| (2) $FeO + CO \rightleftarrows Fe + CO_2$ | −3,730 |
| (3) $3Fe + 2CO \rightleftarrows Fe_3C + CO_2$ | −36,400 |
| (4) $2CO \rightleftarrows C + CO_2$ | −40,700 |

The oxides are reduced as shown in (1) and (2). The formation of cementite and free carbon proceed as shown in Equations 3 and 4. All of these reactions are exothermic; (1) and (2) proceeding faster at higher temperatures, preferably between 1290° and 1650° F., (3) and (4) being favored at lower temperatures of 850° to 1300° F. Hydrogen is also effective in reducing the iron oxide but the hydrogen reactions are not shown as the producer gas is usually richer in carbon monoxide and most of the iron oxides are reduced due to the carbon monoxide.

The mass of iron, iron carbide and free carbon is then reacted in an oxidizing stage with steam, or steam and $CO_2$. Under these conditions the following reactions taken place:

| Oxidation Reaction | $\Delta H$ (700° C.) calories |
|---|---|
| (5) $C + H_2O \rightleftarrows H_2 + CO$ | 32,520 |
| (6) $Fe_3C + H_2O \rightleftarrows 3Fe + H_2 + CO$ | 28,100 |
| (7) $Fe_3C + CO_2 \rightleftarrows 3Fe + 2CO$ | 36,400 |
| (8) $Fe + H_2O \rightleftarrows FeO + H_2$ | −4,570 |
| (9) $3FeO + H_2O \rightleftarrows Fe_3O_4 + H_2$ | −9,800 |
| (10) $2Fe_3C + 3.5H_2O + 1.5CO_2 \rightleftarrows 3.5H_2 + 3.5CO + 3Fe + 3FeO$ | 56,112 |
| (11) $Fe_3C + 3H_2O \rightleftarrows 3FeO + CH_4 + H_2$ | −39,700 |
| (12) $Fe_3C + 2H_2 \rightleftarrows CH_4 + 3Fe$ | −27,950 |
| (13) $2H_2 + 2CO \rightleftarrows CH_4 + CO_2$ | −62,400 |
| (14) $Fe + CO_2 \rightleftarrows FeO + CO$ | 3,730 |
| (15) $3Fe + 4CO_2 \rightleftarrows Fe_3O_4 + 4CO$ | 9,700 |
| (16) $3FeO + CO_2 \rightleftarrows Fe_3O_4 + CO$ | −1,490 |
| (17) $Fe + CO + 2H_2 \rightleftarrows CH_4 + FeO$ | −49,300 |
| (18) $2Fe + CO_2 + 2H_2 \rightleftarrows CH_4 + 2FeO$ | −35,900 |

Synthesis gas results directly from (5) and (6). The reaction of $CO_2$ with iron carbide results in CO (7), while the reaction of steam with metallic iron and ferrous oxide produces hydrogen (8) and (9). The over-all reaction of $Fe_3C$ with steam and $CO_2$ (10) gives a mixture of 1:1 ($H_2$:CO) synthesis gas, which is generally the most useful ratio, although by proper selection of reaction variables and quantities of $CO_2$ and steam fed to the unit, any ratio gas mixture may be made. Reactions 11, 12 and 13 produce methane and are exothermic.

Reactions 14, 15, and 16 produce CO by the reaction of iron and ferrous oxide with carbon dioxide. In addition to Reactions 11, 12, and 13, methane is also produced according to Equations 17 and 18. The former may be considered as a combination of the catalytic reaction $$CO + 3H_2 \rightleftarrows CH_4 + H_2O$$

and the reaction $$H_2O + Fe \rightleftarrows FeO + H_2$$

and the addition of these equations gives Reaction 17. The iron may thus serve both as a catalyst and to participate in the reaction to take up one atom of oxygen. This results in the consumption of two mols of hydrogen per mol of methane, whereas the straight catalytic reaction consumes three mols of hydrogen.

By virtue of low cost and high reactivity iron and iron oxides are the preferred solid starting materials. These may be employed separately or in mixtures. Among the oxides which may be employed are the naturally occurring magnetite ($Fe_3O_4$) ores, such as Alan Wood magnetite, hematite ($Fe_2O_3$) ore, or the various compounded iron oxide Fischer-Tropsch catalysts. Activators employed in the Fischer-Tropsch reaction such as copper, as well as alkali promotors may be employed with advantage.

Instead of producer gas, other carbon monoxide and hydrogen-containing gases may be employed, such as Fischer-Tropsch tail gas, for example. The carbon dioxide employed in the oxidation stage may be derived from any convenient source such as that removed from Fischer-Tropsch operation or from the reduction-carburization stage of the process where the spent producer gas may be scrubbed to recover carbon dioxide.

A fixed bed, moving bed, or fluidized bed may be employed. We prefer, however, to employ a fluidized bed or a bed of freely falling solids, which may be baffled, or non-baffled, because of the well-known advantages which are inherent therein. Granular solids in the range of 20 mesh and finer assure a high geometric surface area and a much more rapid rate of reaction than in the cyclic fixed-bed steam-iron process for making hydrogen.

Figure 1:
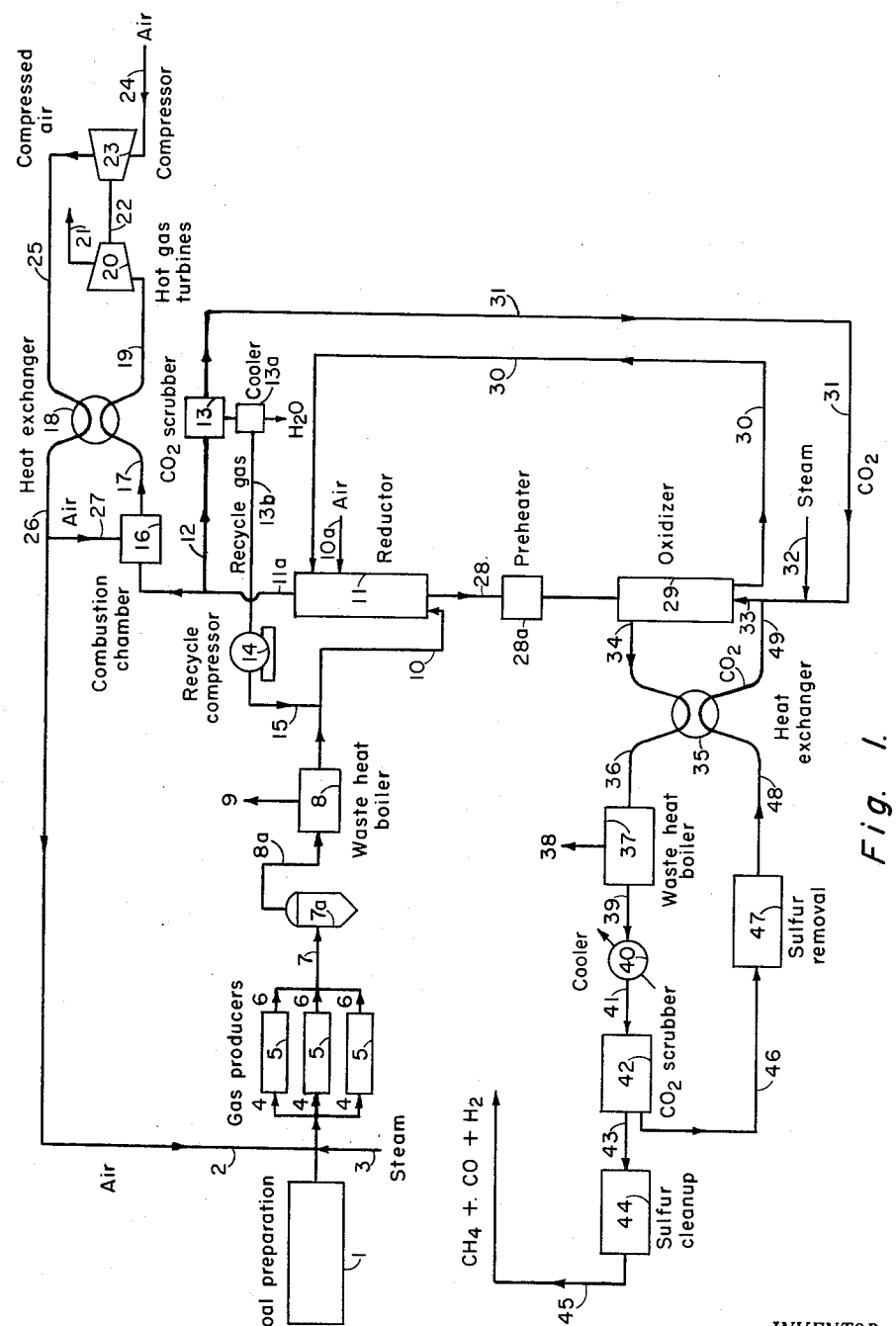
FIGURE 1 represents schematically one arrangement for practicing the invention.

The invention is best understood with reference to the accompanying schematic drawing, FIG. 1, which is intended primarily as a flowsheet. Conventional valves, pumps, storage tanks, etc., have been omitted from the figure for the sake of simplicity, but their use where necessary is obvious to those skilled in the art.

Crushed and screened coal from the coal preparation unit 1 flows together with air from line 2 and steam from line 3 through line 4 into the gas producer 5. The gas producer may operate at atmospheric pressure, but preferably at pressures up to 450 p.s.i.g. to minimize equipment size. Producer gas consisting, for example, of 29% carbon monoxide, 15% hydrogen, 50% nitrogen, 5% carbon dioxide and 1% methane on a dry basis leaves the producer at a temperature of about 1800°–2000° F., a sufficiently high temperature to eliminate tar and keep methane formation at a low level, via lines 6 and 7 to a dust removal unit 7a, which may be a cyclone, precipitator or similar device. After the particulate matter is removed, the gas flows through line 8a to a waste heat boiler 8 where the gas is cooled to about 600°–1000° F. The heat removed from the gas is used to produce steam which is withdrawn via line 9. Further cooling to remove hydrogen sulfide and carbon dioxide may be done at this point in conventional equipment if desired. If necessary, the gas pressure is changed to atmospheric or other pressure desired and flows through line 10 to the bottom of reductor vessel 11 into which pulverized solids consisting of $Fe_3O_4$ and FeO and possibly some residual free iron are introduced at the top via line 30. The mixture of solids flowing down through vessel 11 may be contacted with products of combustion resulting from air entering through line 10a, burning unused product gas in an upper zone and thus imparting heat to the solids and raising the temperature of the solid mass. The solids are introduced at 1100° to 1650° F., and kept in vessel 11 for sufficient time to reduce the oxides in the upper portion of the bed in accordance with Equations 1 and 2, and to effect carburization to form cementite ($Fe_3C$) and some free carbon according to Equations 3 and 4 in the lower portion of the bed. Hydrogen contained in the producer gas is also effective in reducing $Fe_3O_4$ and FeO in the upper portion of the bed. With the exception of the reaction involving the reduction of the oxides with hydrogen, all the reactions are exothermic so that no heat need be added to the reductor.

The desired level of solids in the reactor is maintained by controlling the rate of solids feed and withdrawal. The producer gas passes upward through the bed, and a countercurrent solids-gas system is effected in which the most highly reducing gas contacts the most highly reduced solids. Carbide formation is favored by thermodynamic equilibria at lower temperatures, but the rate of carbide formation becomes excessively slow, below about 850° F. The temperature of the solids at the lower portion of the bed is maintained at 850° to 1300° F., preferably 930° to 1200° F., by introducing the gas at a temperature to favor the carburization of the reduced material. The upper main portion of the bed is kept at 1300° to 1650° F., to achieve a high rate of reduction of the solids and high utilization of the reducing gas. The reductor is preferably at pressures greater than atmospheric and up to 500 lbs./sq. in. The oxide is reduced in the upper portion of the bed and carbided to cementite, $Fe_3C$, in the lower portion. Spent producer gas leaves vessel 11 through line 11a. A portion of the spent gas is withdrawn through line 12, heat exchanged with the scrubbed recycle gas and sent preferably to a hot carbonate purification system 13 for removal of carbon dioxide at 200° to 300° F., to conserve heat. The carbon dioxide recovered is used in the oxidation cycle, subsequently described. The spent producer gas, still containing substantial amounts of carbon monoxide and hydrogen, after carbon dioxide removal can be cooled to reduce water vapor to a lower value in cooler 13a by condensation and removal as liquid water, and thus be of favorable composition for further reduction and carburization. It is then recycled to the reduction vessel via line 13b, recycle compressor 14, and line 15. Use of a recycle stream in which water vapor and carbon dioxide have been reduced to a low value will reduce the water vapor and carbon dioxide concentration in the mixed gas fed to the reductor. By this method, a higher utilization of the producer gas, amounting to 70–90% of the contained hydrogen and carbon monoxide, can be achieved rather than only about 60% without the purified recycle stream. Although the nitrogen percentage of the recycle stream may be built up, the rate of reduction of the solids is not affected by the higher nitrogen content.

In some cases the use of recycle gas may not be necessary and the total spent producer gas may be used as an energy source in the following manner. The remaining portion of the spent gas, still at essentially the same pressure as vessel 11, flows to combustion chamber 16, where it is burned with air from line 27. The hot products of combustion flow through line 17 to heat exchanger 18, where they give up heat to the air required for combustion, and also for the gas producer, and then pass through line 19 to provide the motive force for gas turbine 20. Exhaust gases from the turbine are discharged through line 21 and may be sent to a waste heat boiler for steam generating purposes. The hot gas turbine is mechanically connected by drive 22 to the air compressor 23 in which air, entering line 24, is compressed for use in the system. The compressed air flows through line 25 and is heated in heat exchanger 18. Then the air flows through line 26, and most of it is sent to the gas producer 5 via line 2 with a portion removed by way of line 27 to the combustion chamber 16. By using the residual energy in the spent producer gas in this manner energy required for compression of combustion air can be obtained from the producer gas alone without additional energy input.

The carburized iron, consisting of iron, iron carbide and a small amount of carbon, from vessel 11, leaves through line 28 to oxidation vessel 29, via preheater 28a, discussed hereinafter, where the pressure may range from atmospheric to about 150 p.s.i.g. Should the oxidation vessel be operated at a higher pressure, as when a gas rich in methane is desired, lock hoppers or a similar device may be used to pressurize the solids. If synthesis gas for the Fischer-Tropsch reaction is desired, vessel 29 may be advantageously operated at a somewhat lower pressure than the Fischer-Tropsch reaction pressure range and the synthesis gas compressed to the desired pressure. If the pressures of the reductor and the oxidizer are the same, pressure hoppers are not required. In the oxidation vessel the solids are contacted in a countercurrent manner by steam fed from line 32 and carbon dioxide from lines 31 and 49 compressed to the proper pressure. The mixture of iron, cementite, and free carbon is converted to $Fe_3O_4$, FeO and Fe, which leaves via line 30 for return to vessel 11. Any conventional means may be used to return the solids to vessel 11 such as gas lift, screw conveyors or bucket elevators. The gaseous product formed in vessel 29 is chiefly hydrogen and carbon monoxide, in accordance with Equations 5–10 inclusive, with lesser amounts of carbon dioxide and methane, when the temperature at the top of oxidizer 29 is maintained at about 1290° to 1750° F., preferably 1350° to 1650° F. Solids preheater 28a in line 28 brings the solids leaving the carbiding zone of the reductor to the required temperature before entering the top zone of the oxidizer 29.

If the top of vessel 29 is at a lower temperature range (preferably 1000° to 1200° F.), the formation of methane is favored in accordance with Equations 11, 12 and 13, with lesser amounts of hydrogen and carbon monoxide being formed. An increase in pressure also favors methane formation, the preferred range being 150 to 500 p.s.i.g. The temperature effect is shown graphically in FIGURE 2 and will be discussed in more detail later. Some overlap in temperature range is permissible as the methane content of the synthesis gas can be depressed in the lower temperature range by increasing the ratio of steam and carbon dioxide to iron mass. Little or no heating of the solids before entering the top of the oxidizer is required in this case.

The gaseous product leaving vessel 29 flows through line 34 to heat exchanger 35 where it is lowered in temperature, and then flows through line 36 to waste heat boiler 37, where it is further cooled to about 400° F. Steam produced in the waste heat boiler is withdrawn through line 38 while the gases flow through line 39 to cooler 40 which may be a shell and tube water cooler, or direct contact packed tower cooler. The gas flows through line 41 to carbon dioxide scrubber 42, then through line 43 to a sulfur remover 44 to remove hydrogen sulfide from the product gas. The purified gas is then available at line 45. The carbon dioxide removed in the purification step 42 flows through line 46 and is freed of sulfur compounds in unit 47 before returning to vessel 29 via line 48, heat exchanger 35 and line 49. The methane content of the purified gas may be quite low, 1–5%, and the gas thus is suitable for synthesis with the contained hydrogen and carbon monoxide.

In another modification of the process of FIGURE 1, the reduced mass, consisting essentially of $Fe_3C$ is treated with steam alone in oxidizer 29. The temperature therein is maintained within the range of 950° F. to 1350° F., preferably 1000–1200° F., and the pressure at from about 250 to about 500 p.s.i.g. A gas consisting largely of methane resulting from the primary reaction of Equation 11 is produced along with minor amounts of CO, $H_2$, and $CO_2$ produced by secondary reactions. By passing this gas mixture over a nickel or iron methanation catalyst at methanation conditions, the methane content may be substantially increased.

A further modification of this process of FIGURE 1 may be had by substituting hydrogen for steam or steam plus $CO_2$ as the gaseous reactant with $Fe_3C$. Relatively lower temperatures, and higher pressures, as in the method employing steam alone, favor this reaction. The methane is produced in accordance with Equation 12.

Figure 3:
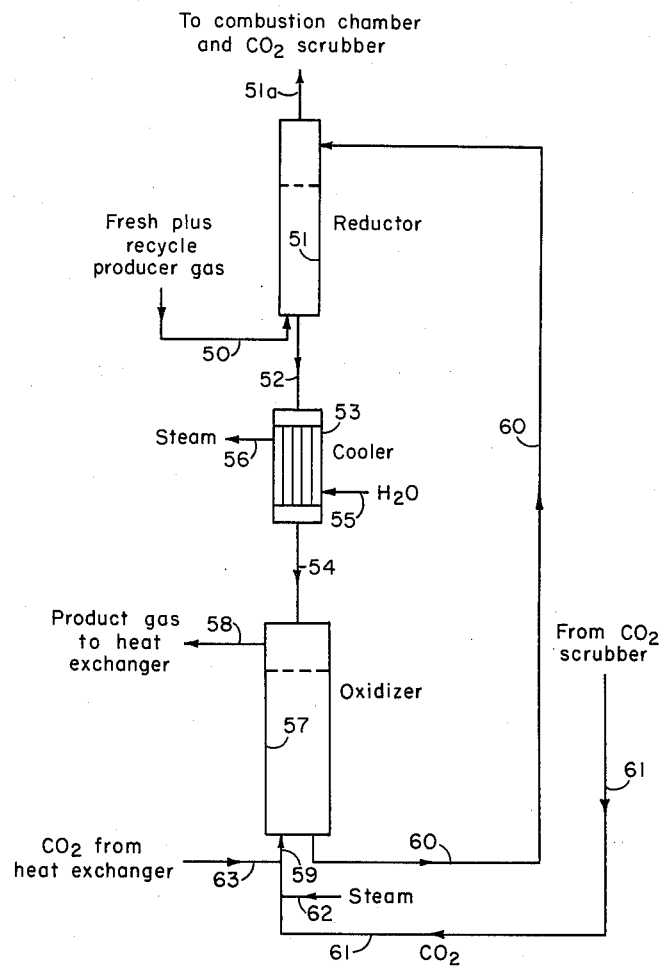
FIGURES 3 and 4 are modifications of the reductor-oxidizer portion of FIGURE 1.

In the modification shown in FIGURE 3 a process for making mixtures of hydrogen, carbon monoxide and methane is shown where little or no carbide and carbon is formed from the producer gas. With this method the solids emerge from the reductor via line 52 at temperatures between 1250° F. and 1750° F., a range wherein carbide is not readily formed, the reaction of Equations 1 and 2 predominating. Producer gas plus recycle gas enter the bottom of the reductor 51 via line 50, and a mixture of iron oxides, predominantly $Fe_3O_4$, enters the reductor 51 at the top via line 60. The iron oxides pass countercurrent downward through the reductor and the reduced iron is removed through line 52, and the spent gas by line 51a. It is possible to control the temperature of the fresh gas and recycle produced gas entering 51 via line 50, and by so doing control the temperature of the reduced solids leaving by line 52. It is preferable to have the solids emerge from vessel 51 at a temperature at least 1250° F. or higher, so a rapid rate of reduction is maintained in vessel 51. Steam and carbon dioxide are fed into vessel 57 by lines 61, 62 and 63, preferably preheated to temperatures of 1100° F. to 1300° F., so that the temperature in the oxidizer is maintained at this high level to maintain a rapid rate of reaction. The steam and carbon dioxide rise countercurrent to the solids coming down through vessel 57 and the reduced iron is oxidized, thereby making carbon monoxide and hydrogen from the steam and carbon dioxide. The gas then rich in hydrogen and carbon monoxide leaves by line 58.

If a gas rich in methane, from 30 to 70 percent, is desired, the solids leaving vessel 51 by line 52 are cooled in heat exchanger 53, water entering at 55 and steam being withdrawn via line 56; they then pass into vessel 57 by line 54 at a temperature of 950° to 1350° F., preferably 1000°–1200° F. At this temperature it may be seen from FIGURE 2 that the yield of methane is quite high and therefore the product gas leaving line 58 will be rich in methane.

If a gas low in methane is desired, cooler 53 may be omitted and the temperature of the solids through line 54 into oxidizing vessel 57 will then be 1250° F. or above. At these higher temperatures the formation of methane is not favored. It is necessary in this modification to obtain most of the carbon monoxide appearing in the product gas from carbon dioxide used as an oxidizing gas with the steam as shown in Equations 14, 15, and 16. Little or no carbon monoxide is formed from cementite or free carbon as the conditions for forming cementite are not favorable in the reduction vessel.

Figure 4:
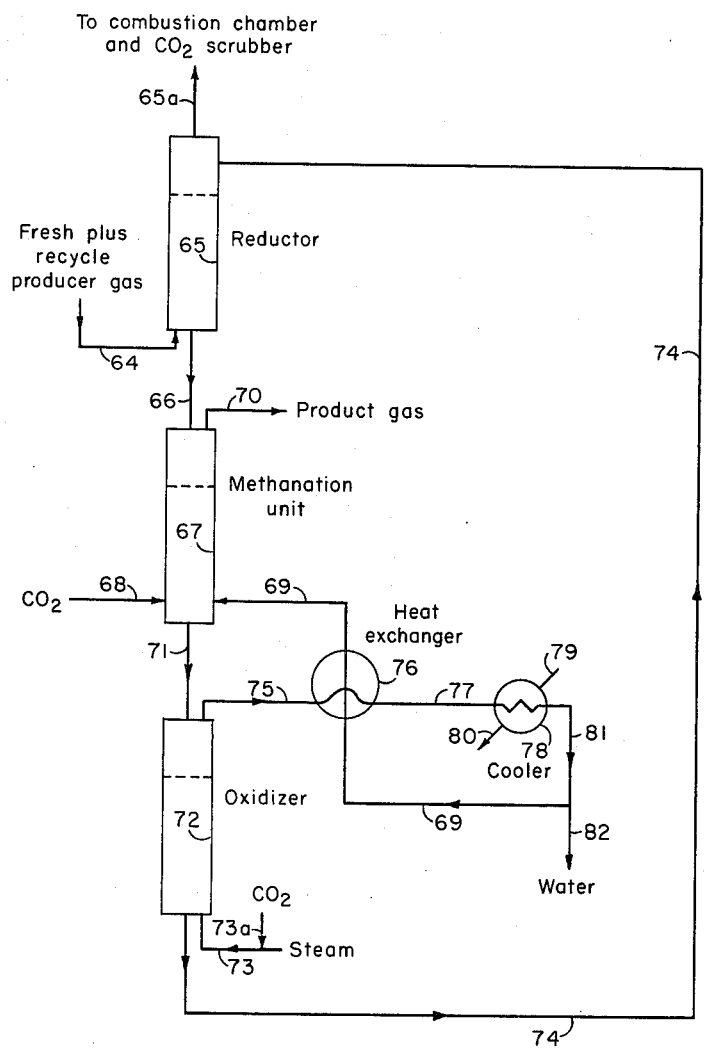

The modification of the process shown in FIGURE 4, illustrates another method for increasing the methane content of the product gas. In this modification, reductor 65 is similar to 51 in FIGURE 3, and 11 in FIGURE 1; and similarly the gas feed through line 64, the solid iron compound through line 74 and spent gas removal through 65a are analogous to the corresponding portions of FIGURES 1 and 3. The iron product carbided as described in connection with FIGURE 1, or reduced as described in connection with FIGURE 3 without any appreciable amount of carburization, is led into methanation unit 67 via line 66 and there contacted with reactant gas mixture of hydrogen, carbon monoxide and carbon dioxide admitted by line 69 at temperatures and pressures which favor the production of methane. The range of temperature is 950°–1350° F., and pressure of 150–500 p.s.i.g. A mixture of gases containing methane, carbon oxides, and hydrogen is removed by 70. The solid product mass, comprising ferrous oxide and iron, is led into oxidizer 72 and there contacted with a mixture of steam and carbon dioxide admitted via lines 73 and 73a, at a temperature of 1290°–1750° F., and a pressure similar to that of the methanation unit so that transfer of solids is made without need of lock hoppers. Carbon dioxide may be fed optionally to methanation unit 67 via line 68 rather than to the oxidizer 72. A mixture of iron and iron oxides relatively high in magnetite, $Fe_3O_4$, is removed via line 74 and recycled to reductor 65. A gaseous mixture of steam hydrogen and carbon oxides is removed overhead from 72 by means of line 75, and led through heat exchanger 76 through cooler 78, having a water inlet 79 and exit 80. The cooled gas leaves 78 through removal line 81 and the condensed water is removed through line 82, resulting in a higher yield of methane in the product gas. The rest of the gas stream is passed through heat exchanger 76 and admitted into the methanation unit 67 through line 69. Product gas relatively rich in methane is recovered overhead from unit 67 and by line 70.

With proper operating conditions the methane content may be 30–70% and the gas suited for use as fuel gas. The methane content of the gas may be further increased to 90–95% by catalytic methanation by passing it over a suitable catalyst, such as reduced nickel, to react the residual hydrogen, carbon monoxide and carbon dioxide to methane in accordance with the following equations:

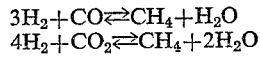
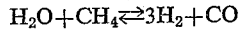

In general, it may be said that the deposition of the free carbon in accordance with Reaction 4 is not as desirable as is the formation of iron carbide ($Fe_3C$) according to Reaction 3. We have found that the iron carbide is rapidly formed, and is extremely reactive when contacted with carbon dioxide and steam in the oxidizing vessel. A smaller portion of the carbon is deposited as free carbon, and, although not as reactive as cementite, the free carbon can be gasified with steam and carbon dioxide in the bottom zone of the oxidation vessel, at the higher temperatures that exist there. Any unreacted free carbon may be burned with a small amount of air admitted to the top of the reduction vessel via line 10a (see FIGURE 1) as described earlier, if desired.

We have found the use of recycling spent producer gas after carbon dioxide scrubbing and cooling to remove the water vapor highly advantageous in utilizing more of the hydrogen and carbon monoxide in the producer gas. Although the nitrogen content of this recycle gas may be as high as 70 to 80 percent, it does not slow down the rate of reaction when mixed with the fresh producer gas at the higher pressures of reduction. Inasmuch as carbon dioxide is required in the oxidation step, it is highly advantageous to combine the two operations, that of recovering carbon dioxide for further use and that of employing the carbon dioxide-free recycle gas.

The selection of the proper pressure for the reductor and carburizer, and also of the oxidation vessel depends on the type of product gas desired. In general, the use of elevated pressures for the gas producer and reduction systems will result in smaller equipment, and allow economical removal of carbon dioxide because of the elevated pressure. Operation of the oxidation vessel could be done in the range of 1 atmosphere to 150 p.s.i.g. economically as this lower pressure will favor formation of hydrogen and carbon monoxide if these are the gases desired. This is seen in Equations 5, 6 and 7 and 10 where there is an increase in the volume of the gaseous products when compared to the volumes of the gaseous reactants. On the other hand, should high yields of methane be desired, it is preferable to operate the oxidation and methanation vessel at a somewhat higher pressure, as for example, from 150 to 500 p.s.i.g. It can be seen that in Equations 11, 12, and 13 there is a reduction in volume when comparing the methane product gas volume to the volume of the gaseous reactants, thus indicating the desirability of higher pressures.

Figure 2:
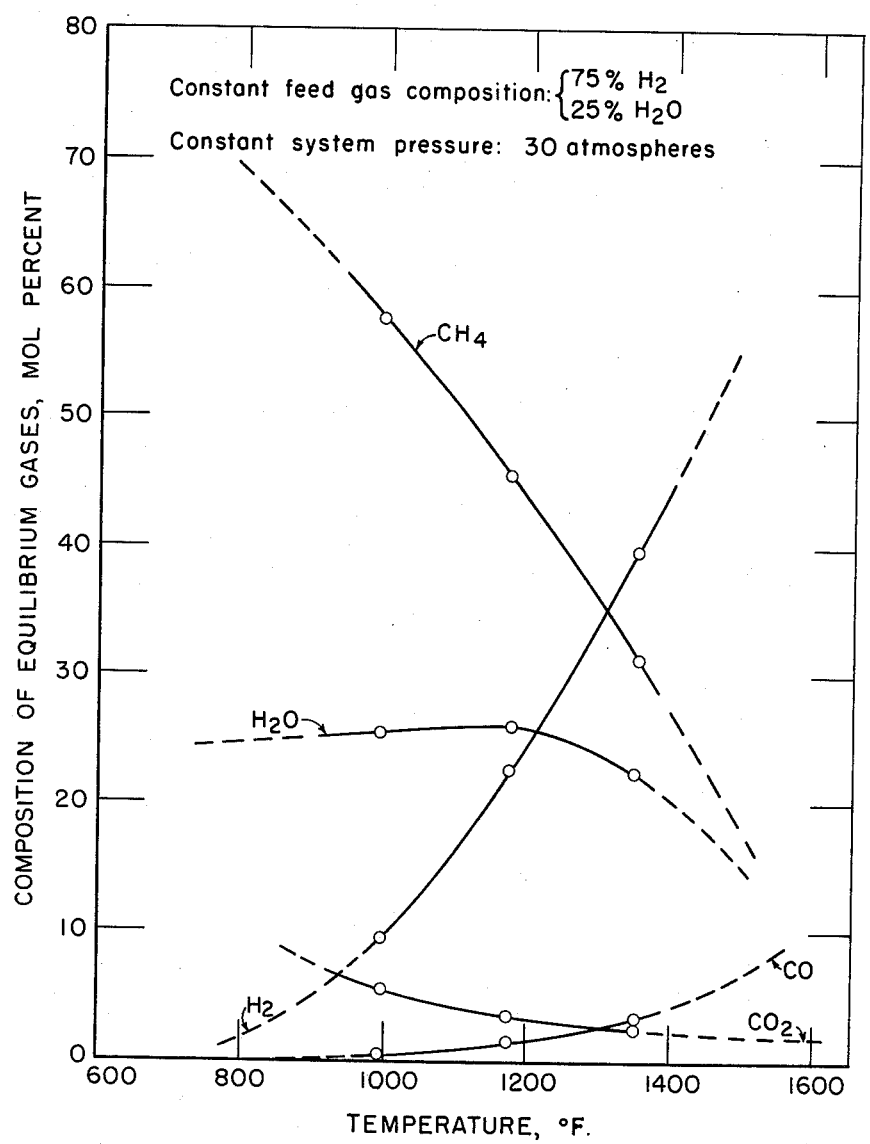
FIGURE 2 is a graph showing the composition of the product gases at different temperatures.

The effect of temperature of operation at the top of the oxidation vessel of FIGURE 1 is critical, and may be seen in FIGURE 2. This graph shows the analysis of the product gas at various temperatures in equilibrium with cementite at 30 atmospheres of pressure when treated with a gas having a composition of 75 percent hydrogen and 25 percent steam. These percentages of hydrogen and steam may exist at the entrance to the upper section of the oxidation unit when pure steam is fed into the bottom of the unit. The steam, as it travels upward, countercurrent to the downcoming solids, reacts with the iron to form oxide and hydrogen, so that when it reaches the top of the oxidation vessel the gas phase will be rich in hydrogen. It will be seen from the graph that the higher percentages of methane are favored by the lower temperatures. Practically, however, inasmuch as the rate of reaction becomes too slow to be of commercial interest at very low temperatures, the desirable operating range for the temperature when making high yields of methane is 950°–1350° F., and preferably 1000° to 1200° F. Above a temperature of 1350° F., it will be seen that the concentration of methane is below 30 percent, and drops rapidly at higher temperatures. Should a synthesis gas low in methane be desired, it would be advantageous to supply an excess of steam or carbon dioxide so that the reactions

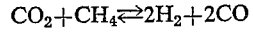

proceed to a greater extent. It will be seen that with the choice of operating conditions such as temperature, pressure, ratios of steam and carbon dioxide, gas of virtually any composition in methane, hydrogen and carbon monoxide may be made. Much the same relationship exists in a system where the carbide is replaced with reduced iron and mixtures of carbon dioxide and steam are passed into the solid mass.

EXAMPLE

The following example is illustrative of the invention for making synthesis gas in accordance with the modification shown in FIGURE 3:

Magnetite solids, consisting of about 90% $Fe_3O_4$ and 10% inert oxides, of 20–100 mesh size was fed to the top of a 2-inch diameter stainless steel reduction vessel at a rate of 10 pounds per hour. Producer gas together with recycled gas from the reductor was fed to the bottom of the reductor countercurrent to the solids. The rate of gas flow was 180 cubic feet per hour and the composition of the total feed gas was 10% $H_2$, 12% CO, 70% $N_2$, 6% $CO_2$, and 2% $CH_4$.

A bed height of 4 feet of solids was maintained by adjusting the rate of solids discharge. The reduction pressure was 300 pounds per square inch gage, and the temperature was 1400° F. By use of the recycle, 80% conversion of the hydrogen and carbon monoxide was obtained. The spent producer gas had the following analysis on a dry basis: 8.8% CO, 6.2% $H_2$, 7.6% $CO_2$, 75.3% $N_2$. The solids leaving the reductor consisted mainly of Fe with some FeO. At the operating temperature of 1400° F. no $Fe_3C$ was formed.

The reduced solids flowed to a hopper for storage from which they were charged to the oxidation step in the same manner as the reduction. The oxidation gas, consisting of 1 part steam and 1 part $CO_2$ by volume, was passed upward through the solids at a rate of 97 cubic feet per hour. The solids flow was 36 pounds per hour. The oxidation pressure was 200 lbs. per sq. in. gage and the temperature 1400° F. About 43% of the steam and $CO_2$ was converted.

The product gas leaving the reactor consisted of 26.0% $H_2$, 34.1% CO, 39.9% $CO_2$ on a dry basis. The solids discharged from the oxidizer were composed of $Fe_3O_4$, FeO, and Fe. These flowed to a hopper for use in another cycle of operation.

In an operation to make a high-B.t.u. gas in accordance with FIGURE 4 rather than synthesis gas, the reduction was conducted in the same manner as previously described. The oxidation step was also conducted similarly but at 300 lbs. per sq. in. gage, and the steam-to-$CO_2$ ratio of the feed gas was raised to about 4 to 1 to produce a product gas consisting of 75% $H_2$, 10% CO and 15% $CO_2$. After the water vapor was condensed from the gas as shown in FIGURE 4, it was passed to the bottom of the methanator at 200 lbs. per sq. in. gage. The reduced solids consisting of Fe and FeO flowed at a rate of 20 pounds per hour countercurrent to the gas. The temperature in the methanator was 1100° F. At these conditions a gas containing 54% $CH_4$ was produced. The partially oxidized solids containing FeO, Fe and $Fe_3O_4$ flowed to a hopper for further use in the system.

and 1110° F. The percentage of methane in the product gas is 66%. Again in 14–B, iron carburized to $Fe_3C$ is treated with hydrogen at a somewhat lower temperature, 1030° F., in this case a gas containing 74% methane was obtained.

In run 12E–12 iron mass that had been reduced with producer gas at higher temperatures so that little or no carbide has been formed is contacted with a $H_2$—CO—$CO_2$ mixture in the ratio of 6:1:1 under conditions that are identical with experiment 12F–10 above. The only difference between these two experiments is that experiment 12E–12 has no steam present, and consequently the product gases contain 54.2% methane as against only 39.6% in experiment 12F–10 where steam is present in the feed gas. Experiment 12E–12 was operated in accordance with

*Table 1.—Composition of Product Gases*

| Run No. | Temperature, °F. | Pressure, lb./sq. in. | Solids[1] phase | Feed Gas | Molar Ratio | Product gas composition ||||
|---|---|---|---|---|---|---|---|---|---|
| | | | | | | $H_2$ | CO | $CO_2$ | $CH_4$ |
| 6A | 1,240 | 280 | $Fe_3C$ | Steam | | 46.5 | 4.2 | 3.7 | 45.5 |
| 6D | 1,220 | 370 | $Fe_3C$ | do | | 35.0 | | 3.7 | 61.3 |
| 11S–3 | 1,472 | 150 | $Fe_3C$ | Steam/$CO_2$ | 1:1 | 19.0 | 40.2 | 40.2 | 0.6 |
| 12A–10 | 1,292 | 75 | $Fe_3C$ | do | 2:1 | 42.7 | 25.9 | 30.0 | 1.4 |
| 12G–15 | 1,380 | 200 | Fe | do | 1:1 | 30.0 | 34.0 | 35.0 | 1.0 |
| 12F–10 | 1,110 | 300 | Fe | Steam:$H_2$: CO:$CO_2$ | 2:6:1:1 | 42.1 | 10.1 | 8.2 | 39.6 |
| 6C | 1,110 | 308 | $Fe_3C$ | $H_2$ | | 34.0 | | | 66.0 |
| 14B | 1,030 | 300 | $Fe_3C$ | $H_2$ | | 25.4 | | | 74.3 |
| 12E–12 | 1,110 | 300 | Fe | $H_2$:CO:$CO_2$ | 6:1:1 | 36.8 | 5.1 | 3.9 | 54.2 |

[1] Predominant phase present.

Table 1 summarizes experimental conditions and results obtained when the iron mass produced in the reduction stage is contacted with the stipulated feed gas. Run 6–A resulted in a product gas containing 45.5% methane, when steam was passed over an iron mass that had been carbided as in the modification illustrated by FIGURE 1. The pressure of the steam was 280 pounds and temperature 1240° F. In run 6–D when the pressure was increased to 370 pounds per square inch and the temperature was nearly the same, 1220° F., steam passed over carbided iron mass of mesh size 40 to 100, relatively high in cementite, gave a gas that contained 61.3% methane. In run 11–S–3, an iron mass that had been carbided as in the modification illustrated by FIGURE 1 was contacted with a steam and $CO_2$ mixture having a molar ratio of 1:1 at 150 pounds per square inch and 1472° F. The product gas that was obtained was a synthesis gas containing approximately $1H_2$:2CO with 40% $CO_2$ and only 0.6% methane. Upon removal of the $CO_2$ by conventional scrubbing means the product gas would be a good quality synthesis gas. In run 12A–10 the ratio of steam to $CO_2$ was increased to 2:1 and in this run the pressure was reduced to 75 pounds per square inch. The higher steam-to-$CO_2$ ratio gave a gas that was richer in hydrogen as required by some synthesis processes. In these last two runs synthesis gas rather than methane was obtained by operating with somewhat higher temperature as the steam and $CO_2$ mixture was passed over the iron carbide, as well as by having an excess of steam and $CO_2$ that reacts with methane to form hydrogen and CO.

In run 12G–15 the iron mass was reduced with producer gas in accordance with FIGURE 3 so that very little if any carbide was deposited or formed. When steam and $CO_2$ was passed over the reduced iron mass in a 1:1 ratio at a relatively high temperature, 1380° F., a synthesis gas of approximately $1H_2$:1CO was obtained, with only 1% methane. In run 12F–10 at a somewhat lower temperature than the previous experiment, steam, $H_2$, CO and $CO_2$ were passed over the reduced iron mass containing little or no carbide, obtained again in accordance with FIGURE 3, resulting in a product gas that contained 39.6% methane.

In run 6–C, an iron mass that was carburized as in FIGURE 1 was contacted with hydrogen at 308 p.s.i.g. the modification of FIGURE 4 and illustrates the advantage of condensing the steam between the oxidation and methanation stage.

We claim:

1. A process for producing a gas mixture comprising hydrogen, carbon monoxide and methane from a mixture of gases containing a substantial proportion of carbon monoxide, which comprises, reacting a member of the class consisting of iron, iron oxides and mixtures thereof with a gas comprising carbon monoxide at a temperature of from about 850° to about 1650° F. to oxidize the carbon monoxide to carbon dioxide, and form a reduced iron product, and reacting said product with steam and carbon dioxide at a temperature of from about 950° to about 1350° F. and a pressure of about 150 p.s.i.g. to about 500 p.s.i.g.

2. A process for producing a gas mixture comprising hydrogen, carbon monoxide and methane which comprises reacting a member of the class consisting of iron, iron oxides and mixtures thereof with producer gas in a reduction zone at a temperature of from about 850° F. to about 1300° F. to oxidize the carbon monoxide in the producer gas to carbon dioxide and form a curburized iron product, separating carbon dioxide from the spent producer gas, transferring said product to an oxidation zone, reacting it with a mixture of steam and carbon dioxide at a temperature of from about 950° F. to about 1350° F., and a pressure of about 150 p.s.i.g. to about 500 p.s.i.g. to produce a gas mixture comprising hydrogen, carbon monoxide and methane, and a mixture of iron and iron oxides, removing the product gas mixture from the oxidation zone, separating carbon dioxide from the removed gas mixture, recycling the separated carbon dioxide to the oxidation zone, and recycling the mixture of iron and iron oxides to the reduction zone 3. A process for producing a mixture of gases comprising hydrogen and carbon monoxide which comprises, reacting a finely divided member of the class consisting of iron, iron oxide and mixtures thereof, with a gaseous reactant having as an essential reactive ingredient carbon monoxide in a fluidized reduction zone, at a pressure of from 15 p.s.i.g. to 500 p.s.i.g. maintaining the temperature in the upper portion of the reduction zone at a temperature of about 1300° to 1650° F., maintaining the lower portion of said zone at a temperature of about 850° to 1300° F., whereby said carbon monoxide is oxidized to carbon dioxide, and a first solid state carburized iron product is produced, removing spent gas from the reduction zone, introducing the first solid product into an oxidation zone, contacting said first solid product with a mixture of steam and carbon dioxide at a temperature of from about 950° to about 1750° F., and a pressure of from about 15 p.s.i.g. to about 500 p.s.i.g., the pressures in said reduction and oxidation zones being the same recovering a gaseous product comprising hydrogen and carbon monoxide, and a second solid state product comprising iron and iron oxides, and recycling said second product to the reduction zone.

4. A process for producing a mixture of gases comprising hydrogen and carbon monoxide which comprises, reacting a finely divided member of the class consisting of iron, iron oxide and mixtures thereof, with a gaseous reactant having as an essential reactive ingredient carbon monoxide, in a fluidized reduction zone, maintaining the temperature in the upper portion of the reduction zone at a temperature of about 1300° to about 1650° F., maintaining the lower portion of said zone at a temperature of about 850° to about 1300° F., whereby said carbon monoxide is oxidized to carbon dioxide, and a first solid state carburized iron product is produced, removing spent gas from the reduction zone, removing said first solid state product from the reduction zone, heating it in a heating zone, then introducing it into an oxidation zone and reacting it with steam and carbon dioxide at a temperature of about 1290° F. to about 1750° F., and a pressure of about 15 p.s.i.g. to about 150 p.s.i.g., recovering as the product a gas mixture comprising hydrogen and carbon monoxide and a second solid state product comprising iron and iron oxides and recycling said second solid state product to the reduction zone.

5. A process for producing a mixture of gases comprising hydrogen, carbon monoxide and methane which comprises, reacting a finely divided member of the class consisting of iron, iron oxides and mixture thereof, with a gaseous reactant having as an essential reactive ingredient carbon monoxide, in a fluidized reduction zone, maintaining the temperature in the upper portion of the reduction zone at a temperature of about 1300° to about 1650° F., maintaining the lower portion of said zone at a temperature of about 850° to about 1300° F., whereby said carbon monoxide is oxidized to carbon dioxide, and a first solid state product consisting of carburized iron is produced, removing spent gas from the reduction zone, introducing the first solid product into an oxidation zone, contacting said first solid product with a mixture of steam and carbon dioxide at a temperature of from about 900° to about 1250° F., and a pressure of from about 150 p.s.i.g. to about 500 p.s.i.g. recovering a gaseous product comprising hydrogen, carbon monoxide and methane, and a second solid state product comprising iron and iron oxides, and recycling said second product to the reduction zone.

6. A process for producing a mixture of gases comprising hydrogen and carbon monoxide which comprises, introducing a reaction mass comprising of a finely divided member of the class consisting of iron, iron oxides and mixtures thereof into a fluidized reduction zone, introducing a carbon monoxide containing gas upwardly into the lower portion of said reduction zone to maintain said reaction mass in a fluidized state, maintaining the temperature in the upper portion of the reaction zone at a temperature of from about 1300° F. to about 1650° F., maintaining the lower portion of said zone at a temperature of about 850° F. to about 1300° F., whereby said carbon monoxide is oxidized to carbon dioxide, and a first solid state product comprising carburized iron is produced, introducing free-oxygen containing gas into the upper portion of the reduction zone to burn any unreacted combustible gas, removing spent gas from the reduction zone, introducing the first solid state product with a mixture of steam and carbon dioxide at a temperature of from about 900° F. to about 1750° F., and a pressure of from 15 p.s.i.g. to about 500 p.s.i.g. recovering a gaseous product comprising hydrogen and carbon monoxide and a second solid state product comprising iron and iron oxides and recycling said second product to the reduction zone.

7. A process for producing a gas mixture comprising hydrogen carbon monoxide and methane which comprises, reacting a mixture comprising iron oxides with a gaseous reactant having as an essential ingredient carbon monoxide at a temperature of from about 1250° F. to about 1750° F. to produce reduced metallic iron, introducing the metallic iron at a temperature of within the range about 950° to about 1350° F. into an oxidizing zone, introducing steam and carbon dioxide into said zone, maintaining the pressure in said zone with the range of about 150 to about 500 p.s.i.g. and the temperature within the range of 950° F. to about 1250° F., recovering a gaseous product comprising hydrogen, carbon monoxide, and methane, and a solid state product comprising iron oxides, and recycling the latter to the reduction zone.

8. A process for producing a gas mixture comprising hydrogen, carbon monoxide and methane which comprises, reacting a mixture comprising iron oxides with a gaseous reactant having as an essential ingredient carbon monoxide at a temperature of from about 1250° F. to about 1750° F., to produce reduced metallic iron, introducing the latter into a methanation zone, contacting said reduced iron with a gas comprising hydrogen, carbon monoxide and carbon dioxide produced as hereinafter set forth, at a temperature of from about 950° F. to about 1350° F., and a pressure of from about 150 to about 500 p.s.i.g., recovering a gaseous mixture comprising methane, hydrogen, carbon monoxide and carbon dioxide and a solid state product comprising iron and iron oxide, introducing said solid state product into an oxidation zone, contacting said solid product mass with steam and carbon dioxide at a temperature within the range of from about 1290° to about 1750° F., and a pressure of from about 150 to about 500 p.s.i.g., removing a second gaseous product comprising hydrogen, carbon monoxide, carbon dioxide and steam, and a second solid state product comprising iron oxides, removing water vapor from said second gaseous product, conducting the latter as a gaseous reactant into said methanation zone, and recycling the second solid state product to the reduction zone.

9. A process for producing a mixture of gases comprising hydrogen, carbon monoxide and methane, which comprises reacting a finely divided member of the class consisting of iron, iron oxides and mixtures thereof with a gaseous reactant having as an essential reactive ingredient carbon monoxide in a reduction zone, maintaining the temperature of said zone in the range of from about 850° F. to about 1650° F., whereby said carbon monoxide is oxidized to carbon dioxide and a solid state product comprising carburized iron is produced, removing spent gas from the reduction zone, introducing said solid state product into a methanation zone, contacting said solid product with a gas comprising hydrogen, carbon monoxide and carbon dioxide produced as hereinafter set forth, at a temperature of from about 950° F. to about 1350° F., and a pressure of from about 150 to about 500 p.s.i.g., recovering a gaseous mixture comprising methane, hydrogen, carbon monoxide and carbon dioxide, and a second solid state product comprising iron and iron oxide, introducing said second solid product into an oxidation zone, contacting said second solid product mass with steam and carbon dioxide at a temperature within the range of from about 1290° to about 1750° F., and a pressure of from about 150 to about 500 p.s.i.g., the pressure in both the methanation and the oxidation zones being substantially the same, removing a second gaseous product comprising hydrogen, carbon monoxide, carbon dioxide and steam, and a solid state product comprising iron oxides, removing water vapor from said second gaseous product, conducting the latter as a gaseous reactant into said methanation zone, and recycling the mixture of iron oxides to the reduction zone.

10. A process for producing methane which comprises, reacting in a reducing zone a mixture comprising finely divided iron and iron oxides with a gaseous reactant having as an essential ingredient carbon monoxide at a temperature of from about 850° to about 1650° F. to produce a finely divided solid product comprising $Fe_3C$, introducing said solid product into an oxidizing zone maintaining at a temperature of about 950° F. to about 1350° F. and a pressure of about 250 p.s.i.g. to about 500 p.s.i.g., introducing said finely divided solid product into the oxidation zone at an upper portion thereof, introducing steam into said oxidation zone at a lower portion thereof, removing a gas comprising methane overhead as a gaseous product, removing a finely divided solid product comprising iron oxides from the reactor at a lower portion thereof, and transferring said iron oxide product to the reducing zone.

11. The method of claim 3, wherein the gaseous reducing reactant comprising carbon monoxide is producer gas.

12. The method of claim 5, wherein the gaseous reducing reactant comprising carbon monoxide is producer gas and the reduction zone is maintained at an elevated pressure ranging up to about 500 p.s.i.g.

13. A process for producing a gas mixture comprising hydrogen, carbon monoxide and methane from a mixture of gases containing a substantial proportion of carbon monoxide, which comprises, reacting a member of the class consisting of iron, iron oxides and mixtures thereof with a gas comprising carbon monoxide at a temperature of from about 850° to about 1650° F. to oxidize the carbon monoxide to carbon dioxide, and form a reduced iron product, and reacting said product with a gas having as essential reactive ingredients only steam and carbon dioxide at a temperature of from 950° F. to about 1750° F. at a pressure of from about 15 p.s.i.g. to about 500 p.s.i.g. to produce the gas mixture.

References Cited in the file of this patent

UNITED STATES PATENTS

| 1,253,622 | Maxted | Jan. 15, 1918 |
| 1,360,876 | Bray et al. | Nov. 30, 1920 |
| 2,182,747 | Marshall | Dec. 5, 1939 |
| 2,449,635 | Barr | Sept. 21, 1948 |
| 2,514,282 | Holder | July 4, 1950 |
| 2,537,496 | Watson | Jan. 9, 1951 |
| 2,544,574 | Walker et al. | Mar. 6, 1951 |
| 2,819,283 | Montgomery et al. | Jan. 7, 1958 |